US00RE45234E

(19) United States
(12) Reissued Patent
Whitmore et al.

(10) Patent Number: US RE45,234 E
(45) Date of Reissued Patent: Nov. 11, 2014

(54) CATHODIC PROTECTION SYSTEM USING IMPRESSED CURRENT AND GALVANIC ACTION

(75) Inventors: David Whitmore, Winnipeg (CA); John Christopher Ball, Tampa, FL (US)

(73) Assignee: Vector Corrosion Technologies Ltd, Wpg MB (CA)

(21) Appl. No.: 12/552,900

(22) Filed: Sep. 2, 2009

Related U.S. Patent Documents

Reissue of:
(64) Patent No.: 7,264,708
Issued: Sep. 4, 2007
Appl. No.: 10/996,810
Filed: Nov. 26, 2004

(51) Int. Cl.
*C23F 13/20* (2006.01)

(52) U.S. Cl.
USPC ..... 205/734; 205/740

(58) Field of Classification Search
USPC ..... 205/734, 740
See application file for complete search history.

(56) References Cited

U.S. PATENT DOCUMENTS

| | | | |
|---|---|---|---|
| 2,903,405 | A | 9/1959 | Sabins |
| 4,486,288 | A | 12/1984 | Linder |
| H544 | H | 11/1988 | Castillo et al. |
| 4,861,449 | A | 8/1989 | St. Onge |
| 4,900,410 | A | 2/1990 | Bennett et al. |
| 5,674,561 | A | 10/1997 | Dietz et al. |
| 5,714,045 | A | 2/1998 | Lasa et al. |
| 6,022,469 | A | 2/2000 | Page |
| 6,165,346 | A | 12/2000 | Whitmore |
| 6,265,105 | B1 | 7/2001 | Tokuda et al. |
| 6,346,188 | B1 | 2/2002 | Shuster et al. |
| 2008/0047843 | A1 | 2/2008 | Glass et al. |

FOREIGN PATENT DOCUMENTS

| | | | |
|---|---|---|---|
| DE | 101 41 743 | A1 | 3/2003 |
| GB | 2 194 962 | A | 3/1988 |
| GB | 2 286 196 | | 9/1995 |
| JP | 59 193283 | | 1/1984 |
| JP | 2-200787 | | 8/1990 |
| JP | 9-31675 | | 2/1997 |
| WO | WO 03/010358 | A2 | 2/2003 |

*Primary Examiner* — Nicholas A Smith

(74) *Attorney, Agent, or Firm* — Adrian D. Battison; Ade & Company Inc

(57) ABSTRACT

Cathodic protection of steel in a building or other concrete or similar structure is provided by locating an anode in a suitable location adjacent to the steel and providing an impressed current from a power supply to the anode. The anode is formed from a material which is more electro-negative than the steel so that in the event that the power supply falls below the galvanic potential therebetween, current flows under galvanic action to replace the impressed current. A diode in the circuit prevents flow of current across the power supply but allows the galvanic current when the power supply fails open circuit. An additional diode can be provided in the event the power supply fails closed circuit to prevent reverse current flow.

60 Claims, 3 Drawing Sheets

CATHODIC PROTECTION SYSTEM USING IMPRESSED CURRENT AND GALVANIC ACTION

Matter enclosed in heavy brackets [ ] appears in the original patent but forms no part of this reissue specification; matter printed in italics indicates the additions made by reissue.

This invention relates primarily to a cathodic protection system using impressed current and galvanic action and also relates to an improved impressed current system.

BACKGROUND OF THE INVENTION

U.S. Pat. No. 6,346,188 (Shuster) assigned to ENSER Corporation and issued Feb. 12, 2002 discloses a method for cathodic protection of marine piles in which an anode is located within a jacket surrounding the pile at water level and a battery is mounted on the pile above the water level for providing an impressed current between the anode of the jacket and the steel of the pile.

The anode is preferably formed of titanium or other non-corroding materials which are high on the Noble scale. However the patent mentions that other materials such as zinc can be used but these are disadvantageous since they tend to corrode. The intention is that the battery have a long life and be maintained effectively so that the impressed current remains in place during the life of the marine pile bearing in mind that the salt water in the marine environment is particularly corrosive.

Such impressed current systems can use other types of power supply including common rectifiers which rectify an AC voltage from a suitable source into a required DC voltage for the impressed current between the anode and the steel. It is also known to provide solar panels for charging batteries to be used in a system of this type.

In all cases such impressed current systems require regular maintenance and checking of the status of the power supply to ensure that the power supply does not fail leading to unexpected and unacceptable corrosion of the steel within the structure to be protected. While such maintenance can be carried out and the power supply thus ensured, this is a relatively expensive process.

Alternatively galvanic systems can be used which avoid necessity for any power supply since the voltage between the steel and the anode is provided by selecting a suitable material for the anode which is sufficiently electro-negative to ensure that a current is generated to provide a cathodic protection. The systems have obtained considerable success and are widely used.

SUMMARY OF THE INVENTION

It is one object of the invention to provide an improved method for cathodic protection.

According to one aspect of the invention there is provided a method for cathodic protection comprising:

providing steel material;

providing a covering material such that at least a part of the steel material is at least partly covered by the covering material;

providing at least one anode member which is formed of a material which is more electro-negative than the steel material such that galvanic action will generate an electric potential difference therebetween tending to cause a flow of ions;

arranging the anode member at least partly in contact with the covering material for communication of ions therebetween;

providing a first connection between the at least one anode member and the steel material so that the galvanic potential difference between the anode member and the steel material generated by the galvanic action causes ions to flow through the covering material tending to inhibit corrosion of the steel material while causing corrosion of the anode member;

providing a second connection between the at least one anode member and the steel material including a DC power supply having a supply potential difference greater than the galvanic potential difference between the anode member and the steel material generated by the galvanic action such that the supply potential difference causes ions to flow through the covering material tending to inhibit corrosion of the steel material while causing corrosion of the anode member;

the first and second connections being arranged to prevent communication of current through the first connection across the power supply such that when the DC power supply potential difference exceeds the galvanic potential difference current flows through the second connection;

the first and second connections being arranged to allow communication of current through the first connection such that when the supply potential difference falls below the galvanic potential difference current flows through the first connection;

whereby ions are caused by the power supply to flow to provide cathodic protection to the steel material for as long as the power supply is active and, when the power supply is inactive, ions are caused to continue to flow by the galvanic action to continue to provide cathodic protection to the steel material.

The anode may be any of the more electro-negative materials such as zinc, aluminum, magnesium or alloys thereof.

Preferably the power supply is a battery. However rectifiers generating DC from an AC supply voltage can also be used in some arrangements.

Preferably the battery has a potential greater than 1.5V.

Preferably there is provided a diode in the first connection to prevent communication of current through the first connection across the power supply.

Preferably the first connection bridges output terminals of the power supply.

Preferably there is provided a diode in second connection to prevent flow of current in a reverse direction.

In accordance with one important optional arrangement, the battery is not replaced when expired such that when the battery expires the protection is wholly provided by the galvanic action.

In accordance with one important optional arrangement, the covering material comprises a structural material of a building and the battery is buried in the structural material of the building.

In accordance with one important optional arrangement, the structural material forms a wall and wherein the battery is buried in a cavity in the wall.

In accordance with one important optional arrangement, the covering material comprises a structural material of a building and wherein there is provided a plurality of batteries at plurality of respective locations on the building.

In accordance with one important optional arrangement, the building includes a plurality of steel elements each forming, for example, a lintel of the building and wherein there is provided a separate battery for each lintel.

According to a second aspect of the invention there is provided a method for cathodic protection comprising:

providing steel material;

providing a covering material such that at least a part of the steel material is at least partly covered by the covering material;

providing at least one anode member;

arranging the anode member at least partly in contact with the covering material for communication of ions therebetween;

providing a connection between the at least one anode member and the steel material including a DC power supply having a supply potential difference between the anode member and the steel material such that the supply potential difference causes current to flow in the connection in a direction to cause ions to flow through the covering material tending to inhibit corrosion of the steel material while causing corrosion of the anode member;

and providing a diode in connection to prevent flow of current in a reverse direction.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
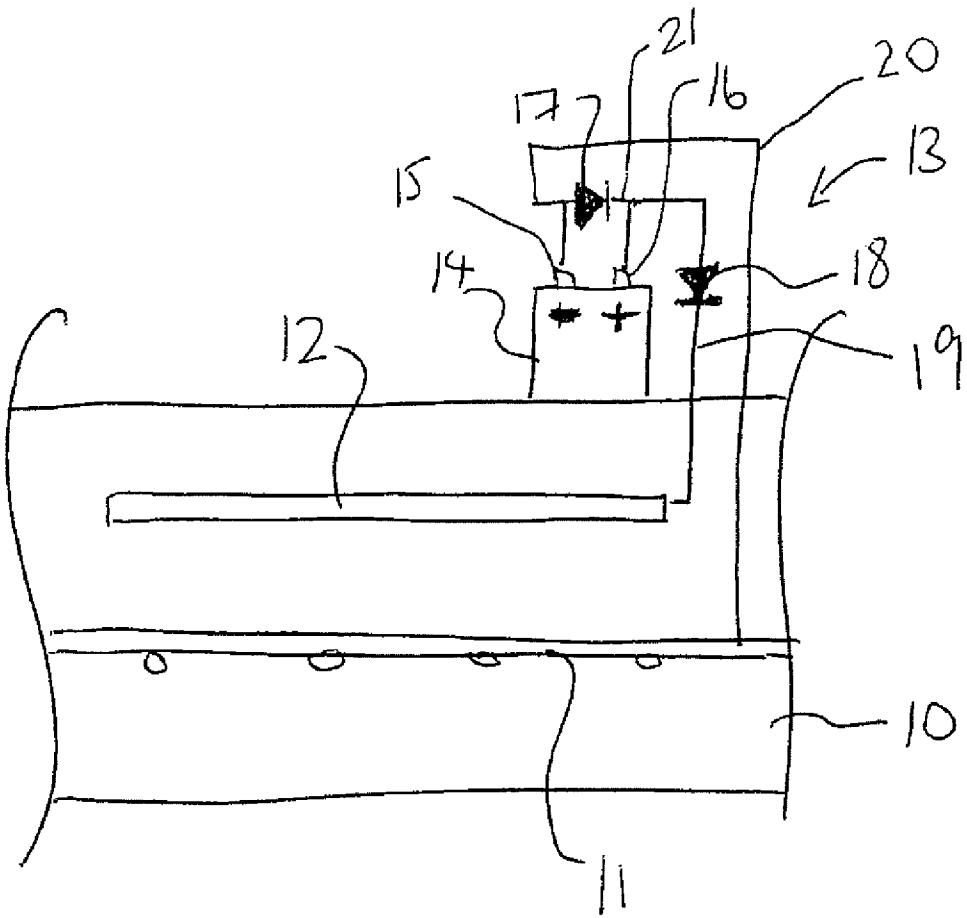
FIG. 1 is a schematic illustration of a cathodic protection method according to the present invention.

In FIG. 1 is shown a covering material 10 within which is embedded steel material 11 and an anode body 12.

The covering material 10 is a suitable material which allows communication of ions through the covering material between the anode body and the steel 11. The covering material is generally concrete but can also include mortar or masonry materials where there is a reinforcing steel structure which requires cathodic protection to prevent or inhibit corrosion. The steel material 11 is illustrated as being a reinforcing bar arrangement but other steel elements can be protected in the manner of the arrangement shown herein including steel structural members such as lintels, supports for exterior hardware or other elements which provide structure to the concrete or other covering material or which provide interconnection between an exterior element and the concrete material.

The anode member 12 is shown as a strip or sheet but can be configured in any suitable arrangement which is arranged to provide communication of ions from the anode body to the steel material.

The anode member may include or be constructed as the arrangement shown in U.S. Pat. No. 6,027,633 issued Feb. 22, 2000; U.S. Pat. No. 6,165,346 issued Dec. 26, 2000; U.S. Pat. No. 6,572,760 issued Jun. 3, 2003 and U.S. Pat. No. 6,793,800 issued Sep. 21, 2004 of the present inventor, and in U.S. Pat. No. 6,022,469 (Page) issued Feb. 8, 2000 and U.S. Pat. No. 6,303,017 (Page) issued Oct. 16, 2001 assigned to Aston Material Sciences and in U.S. Pat. No. 6,193,857 (Davison) issued Feb. 27, 2001 assigned to Foseco International, the disclosures of which are incorporated herein by reference or to which reference should be made for further details as required.

The anode member is preferably formed of zinc or other material which is more electro-negative than the steel so that its presence within the covering material generates a potential difference by way of galvanic action across the anode member and the steel such that the galvanic potential causes transmission of ions between the anode member and the steel material and a current through a conductor system generally indicated at 13 which transmits current between the anode member and the steel.

A power supply 14 is provided which generates a voltage at terminals 15 and 16 of the power supply where the terminal 16 is positive and the terminal 15 is negative.

In the embodiment shown the power supply is formed by a battery which is commonly a zinc air battery well known and commercially available which provides an output voltage of the order of 1.5 volts and has a lifetime of the order of 3 to 5 years. The voltage may drop during current draw in operation from the nominal value to as low as 1.0 volts. Such batteries of this type are commercially available from ENSER Corporation or others. A suitable battery may have a capacity of 1200 ampere hours.

Alternative power supplies maybe used including conventional rectifiers which require an exterior AC supply voltage and which convert the AC supply into a DC voltage at the terminals 15 and 16.

The current supply system generally indicated at 13 further includes a first diode 17 and the second diode 18.

The power supply is connected across the anode member and the steel material by a first connection such that the positive terminal 16 of the battery is attached to the anode member by a first conductor 19 which extends from the positive terminal 16 to the anode member 12. The first connection further includes a second conductor 20 which connects from the negative terminal 15 to the steel material 11. Thus when the battery 14 provides an output voltage greater than the galvanic potential, current flows from the battery through the conductor 19 and returns from the steel through the conductor 20.

In the event that the potential of the battery falls below the galvanic potential, in the situation where the battery has expired or becomes faulty, a second connection is provided across the anode member 12 and the steel material by way of the conductors 19 and 20 together with a further conductor 21 which bridges the terminals 15 and 16. The diode 17 is located in the conductor 21 and is directed so as to prevent current flowing directly from the positive terminal 16 through the conductor 21 to the negative terminal 15. However when the current from the battery fails, the galvanic potential causes current to flow through the conductor 21 in the direction permitted by the diode 17.

The second diode 18 is located either in the conductor 19 or in the conductor 20 and is arranged to prevent reverse current in the first connection.

Thus in the protection system, the power supply 14 provides an initial impressed current system which generates current at a higher level than the galvanic potential for a period defined by the life of the battery. This initial impressed current can be used to cause an initial migration of ions so as to ensure an adequate initial level of protection for the steel material. After this initial level has been achieved, provided the system is properly designed and arranged, the galvanic potential can provide a further level of protection at a reduced current which is sufficient to maintain the migrated ions from returning to the position where corrosion can occur.

When the power supply fails, it normally fails in an open circuit condition so that the conductor 21 is required to allow the galvanic potential to communicate the required current.

However in the event that the power supply fails in a closed circuit condition, the diode 18 is provided in order to prevent reverse current in a direction which would exacerbate the corrosion of the steel material. Thus it is intended that the system should operate over a lifetime of the structure without the necessity for periodic maintenance since the intention is that the battery will operate for a prescribed period and then will fail in a manner which allows the galvanic action to continue.

The selection of the anode body including the amount of sacrificial anode material within the anode body and the further features of design are selected so that the protection is provided over a prescribed lifetime significantly longer than the lifetime of the battery.

The diode 18 is provided to prevent the reverse direction of current flow which would cause corrosion of the steel in preference to the anode. While this is normally not likely to occur when the anode is formed of an electro-negative material, in some design arrangements, the anode may be formed of a material which is more resistant to corrosion and therefore can potentially cause potential corrosion of the steel.

Figure 2:
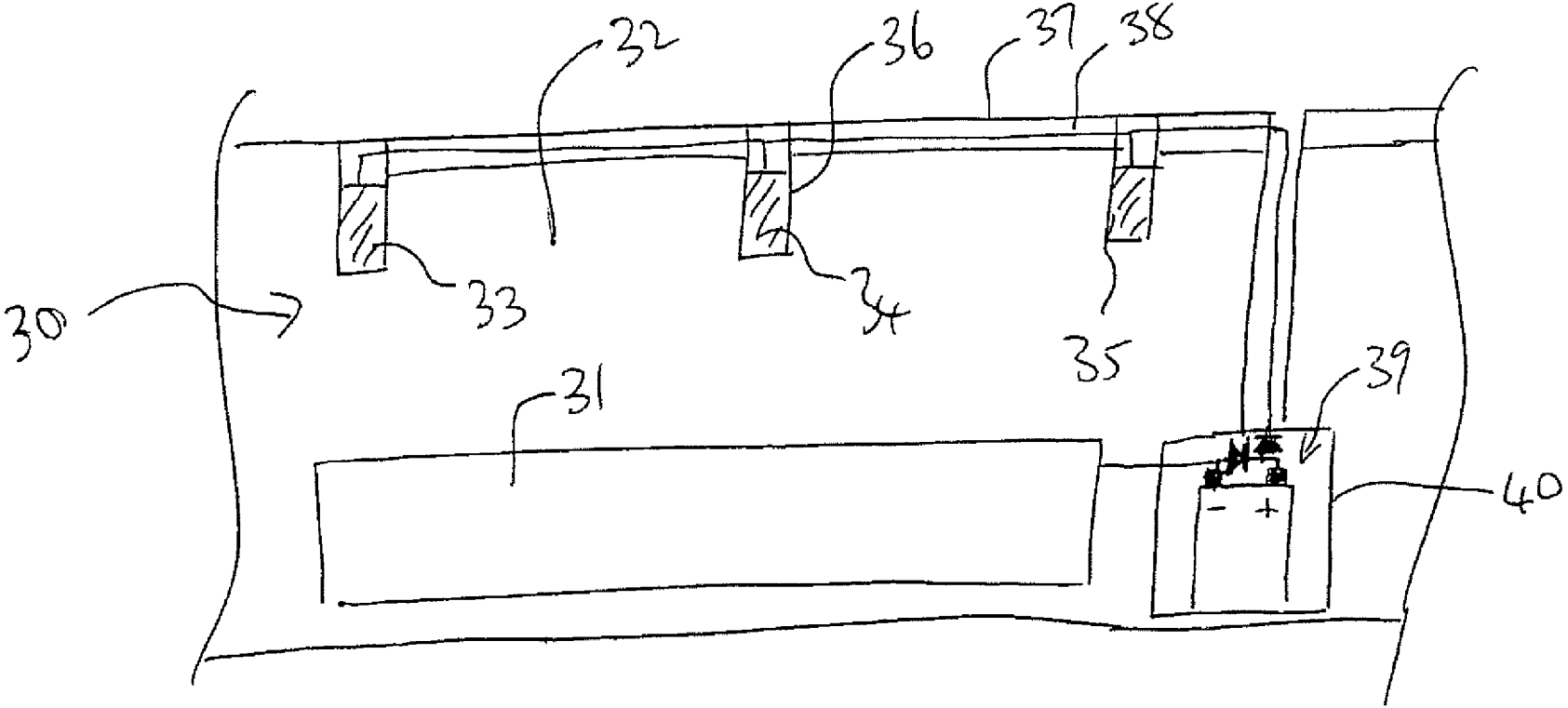
FIG. 2 is a schematic illustration of a second method according to the present invention.

Turning now to FIG. 2, there is shown basically the same arrangement as previously described but used in a modified system for use in a building generally indicated at 30. In the building is provided a lintel 31 formed of steel with the potential for corrosion within the covering material 32 defined in the building. The covering material may be concrete or masonry and commonly will be a series of stones embedded in a mortar material so that the steel is in contact with the stones and the mortar and has the potential for corrosion.

Figure 3:
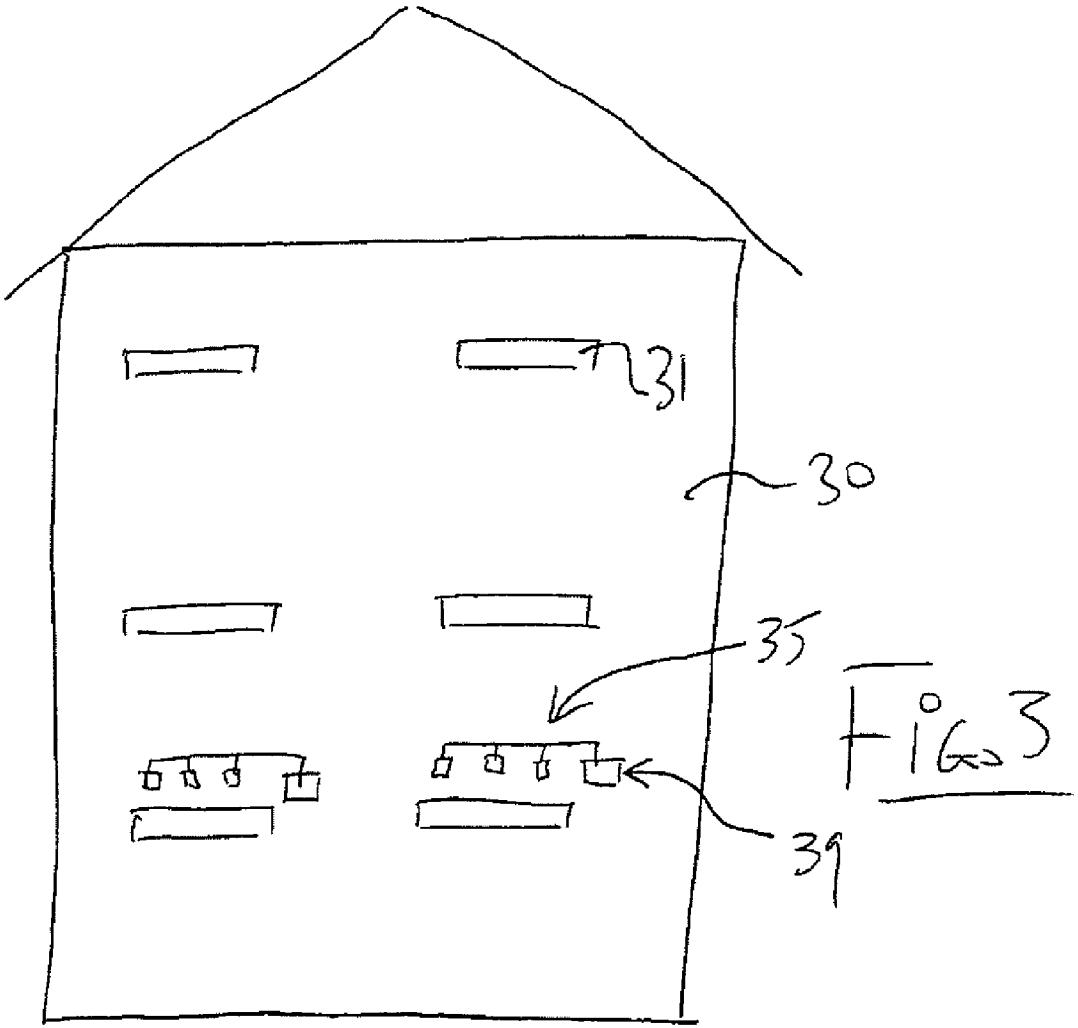
FIG. 3 is a schematic illustration of the components of FIG. 2 installed in a building.

In this embodiment the anode is formed by a series of anode bodies 33, 34 and 35 which are formed as cylindrical elements inserted into drilled holes 36 formed in the structure of the building 30. A channel 37 provides a conduit formed in the wall for a conductor system 38 including a power supply and first and second conduction paths generally indicated at 39 as previously described In FIG. 3 is shown a building schematically indicated at 30 including the lintels 31 and a series of the anode constructions generally indicated at 35 and the power supply systems 39. The power supply system is embedded within a cavity 40 formed in the wall at a suitable location either within a cavity wall construction or within an excavated opening within the building structure. Each lintel has its own power supply 39. Of course the lintel forms only one possibility for steel structure elements within the building which require corrosion protection so that other individual elements may be similarly protected by some individual power supply.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method for cathodic protection of steel material in a covering material *comprising concrete, mortar or masonry material* arranged such that at least a part of the steel material is at least partly covered by the covering material; the method comprising:

providing at least one anode member which is formed of a material which is more electro-negative than the steel material such that galvanic action will generate an electric potential difference therebetween tending to cause a flow of ions;

arranging the anode member at least partly in contact with the covering material for communication of ions therebetween;

providing an electrical connection arrangement between the at least one anode member and the steel material so that current can flow through said at least one electrical connection arrangement between the at least one anode member and the steel material so that ions flow through the covering material tending to inhibit corrosion of the steel material;

providing a DC power supply [having a supply potential difference greater than the galvanic potential difference between the anode member and the steel material generated by the galvanic action];

connecting the DC power supply into said electrical connection arrangement [such that the supply] *to generate a* potential difference [causes ions to flow through the covering material tending to inhibit corrosion of the steel material] for as long as the power supply is active [to generate a supply potential difference] greater than the galvanic potential difference between the anode member and the steel material [generated by the galvanic action];

and said electrical connection arrangement being arranged such that, when the power supply becomes inactive [such that the supply potential difference falls below the galvanic potential difference between the anode member and the steel material generated by the galvanic action], current continues to flow through said electrical connection arrangement by the galvanic action to continue to provide cathodic protection to the steel material.

2. The method according to claim 1 wherein the DC power supply is a battery.

3. The method according to claim 2 wherein the battery has a supply potential difference of the order of or greater than 1.5V.

4. The method according to claim 2 wherein the [covering material comprises a structural material of a building and wherein the] battery is buried in the [structural] *covering* material [of the building].

5. The method according to claim 4 wherein the [structural] *covering* material forms a wall and wherein the battery is buried in a cavity in the wall.

6. The method according to claim 4 wherein the covering material comprises a structural material of a building and wherein there is provided a plurality of batteries at *a* plurality of respective locations on the building.

7. The method according to claim [4] *6* wherein the building includes a plurality of steel elements of the building and wherein there is provided a separate battery for each element.

8. The method according to claim 1 wherein the electrical connection arrangement includes a connection which bridges output terminals of the DC power supply and wherein there is provided a diode in the connection to prevent [communication] *reverse flow* of current through the electrical connection arrangement across the DC power supply.

9. The method according to claim 1 wherein there is provided a diode in electrical connection arrangement to prevent flow of current in a reverse direction.

10. A method for cathodic protection of steel material in a covering material *comprising concrete, mortar or masonry material* arranged such that at least a part of the steel material is at least partly covered by the covering material; the method comprising:

providing at least one anode member which is formed of a material which is more electro-negative than the steel material such that galvanic action will generate an electric potential difference therebetween tending to cause a flow of ions;

arranging the anode member at least partly in contact with the covering material for communication of ions therebetween;

providing an electrical connection arrangement between the at least one anode member and the steel material so that current can flow through said at least one electrical connection arrangement between the at least one anode member and the steel material so that ions flow through the covering material tending to inhibit corrosion of the steel material;

providing a DC power supply [having a supply potential difference greater than the galvanic potential difference between the anode member and the steel material generated by the galvanic action];

connecting the DC power supply into said electrical connection arrangement [such that the supply] *to generate a* potential difference [causes current to flow in the electrical connection arrangement in a required direction so that ions flow through the covering material tending to inhibit corrosion of the steel material] when the power supply is active [and generates a supply potential difference] greater than the galvanic potential difference between the anode member and the steel material [generated by the galvanic action];

providing in said electrical connection arrangement a connection to allow flow of current across the DC power supply such that, when the DC power supply becomes inactive [such that the supply potential difference falls below than the galvanic potential difference between the anode member and the steel material generated by the galvanic action], current continues to flow through said electrical connection arrangement by the galvanic action to continue to provide cathodic protection to the steel material;

and providing in said connection a diode arranged to prevent flow of current across said DC power supply in a direction reverse to said required direction.

11. The method according to claim 10 wherein the DC power supply is a battery.

12. The method according to claim 11 wherein the battery has a potential greater than 1.5V.

13. The method according to claim 10 wherein the [covering material comprises a structural material of a building and wherein the] power supply [comprises a battery which] is buried in the [structural] *covering* material [of the building].

14. The method according to claim 13 wherein the structural material forms a wall and wherein the battery is buried in a cavity in the wall.

15. The method according to claim 13 wherein the covering material comprises a structural material of a building and wherein there is provided a plurality of batteries at plurality of respective locations on the building.

16. The method according to claim [13] *15* wherein the building includes a plurality of steel elements each forming a lintel of the building and wherein there is provided a separate battery for each lintel.

*17. A method for cathodic protection of steel material in a covering material comprising concrete, mortar or masonry material such that at least a part of the steel material is at least partly covered by the covering material, the method comprising:*

*providing at least one anode member which is formed of a material which is more electro-negative than the steel material such that galvanic action generates a galvanic potential difference therebetween;*

*arranging the anode member at least partly in contact with the covering material for communication of ions therebetween;*

*in a first step providing a connection between said at least one anode member and the steel material including a DC power supply such that the potential difference between said at least one anode and the steel material is greater than the galvanic potential difference;*

*and in a second step providing a connection between said at least one anode member and the steel material so that the galvanic potential difference only is applied between the anode member and the steel material.*

*18. The method according to claim 17 wherein the DC power supply is a battery.*

*19. The method according to claim 17 wherein the DC power supply includes a rectifier for rectifying an AC power supply.*

*20. The method according to claim 17 wherein, in the second step, the DC power supply is inactive.*

*21. The method according to claim 17 wherein the DC power supply is located in the covering material.*

*22. The method according to claim 17 wherein the covering material forms a wall and wherein the power supply is located in a cavity in the wall.*

*23. The method according to claim 17 wherein there is provided an electrical connection arrangement including said at least one anode, the steel material and the DC power supply and wherein, when the DC power supply becomes inactive, the electrical connection arrangement is arranged to provide automatically a connection of said at least one anode to the steel material to allow current to flow therebetween caused by the galvanic potential alone.*

*24. A method for cathodic protection of steel material in a covering material comprising concrete, mortar or masonry material such that at least a part of the steel material is at least partly covered by the covering material, the method comprising:*

*providing at least one anode member which is formed of a material which is more electro-negative than the steel material such that galvanic action generates a galvanic potential difference therebetween;*

*arranging the anode member at least partly in contact with the covering material for communication of ions therebetween;*

*in a first step providing a connection between said at least one anode member and the steel material including a DC power supply such that the potential difference between said at least one anode and the steel material is greater than the galvanic potential difference;*

*and in a second step providing a connection between said at least one anode member and the steel material so that the galvanic potential difference only is applied between the anode member and the steel material;*

*wherein, in the first step, the potential difference is arranged so as to cause an initial migration of ions through the covering material so as to ensure an initial level of protection for the steel material and in the second step, the potential difference is arranged so as to provide a current lower than that in the first step, which current is sufficient to limit the return of migrated ions in the covering material to the position where corrosion occurs.*

*25. The method according to claim 24 wherein the DC power supply is a battery.*

*26. The method according to claim 24 wherein the DC power supply includes a rectifier for rectifying an AC power supply.*

*27. The method according to claim 24 wherein, in the second step, the DC power supply is inactive.*

*28. The method according to claim 24 wherein there is provided an electrical connection arrangement including said at least one anode, the steel material and the DC power suppjy and wherein, when the DC power supply becomes inactive, the electrical connection arrangement is arranged to provide automatically a connection of said at least one anode to the steel material to allow current to flow therebetween caused by the galvanic potential alone.*

*29. The method according to claim 24 wherein the DC power supply is located in the covering material.*

*30. The method according to claim 24 wherein the covering material forms a wall and wherein the power supply is located in a cavity in the wall.*

*31. A method for cathodic protection of steel material in a covering material comprising concrete, mortar or masonry material such that at least a part of the steel material is at least partly covered by the covering material, the method comprising:*

*providing at least one anode member which is formed of a material which is more electro-negative than the steel material such that galvanic action generates a galvanic potential difference therebetween;*

*providing in the anode member an enhancement material which cooperates with the sacrificial anode material in enhancing the communication of ions between the covering material and the anode material;*

*arranging the anode member at least partly in contact with the covering material for communication of ions therebetween;*

*in a first step providing a connection between said at least one anode member and the steel material including a DC power supply such that the potential difference between said at least one anode and the steel material is greater than the galvanic potential difference;*

*and in a second step providing a connection between said at least one anode member and the steel material so that the galvanic potential difference only is applied between the anode member and the steel material;*

*wherein there is provided an electrical connection arrangement including said at least one anode, the steel material and the DC power supply and wherein, when in the second step the DC power supply becomes inactive, the electrical connection arrangement is arranged to provide automatically a connection of said at least one anode to the steel material to allow current to flow therebetween caused by the galvanic potential alone.*

*32. The method according to claim 31 wherein the DC power supply is a battery.*

*33. The method according to claim 31 wherein the DC power supply includes a rectifier for rectifying an AC power supply.*

*34. The method according to claim 31 wherein the DC power supply is located in the covering material.*

*35. The method according to claim 31 wherein the covering material forms a wall and wherein the power supply is located in a cavity in the wall.*

*36. A method for cathodic protection of steel material in a covering material comprising concrete, mortar or masonry material such that at least a part of the steel material is at least partly covered by the covering material, the method comprising:*

*providing at least one anode member which is formed of an anode material which is more electro-negative than the steel material such that galvanic action generates a galvanic potential difference therebetween;*

*arranging the anode member at least partly buried within with the covering material for communication of ions therebetween;*

*providing an enhancement material which cooperates with the sacrificial anode material in enhancing the communication of ions between the covering material and the anode material;*

*providing at the anode member a material which is porous so that corrosion products from corrosion of the anode material during operation are received into pores in the porous material;*

*and providing an electrical connection arrangement between said at least one anode member and the steel material including a DC power supply such that the potential difference between said at least one anode member and the steel material is greater than the galvanic potential difference.*

*37. The method according to claim 36 wherein the electrical connection arrangement is arranged such that, when the DC power supply becomes inactive, a connection of said at least one anode to the steel material is provided to allow current to flow therebetween caused by the galvanic potential alone.*

*38. The method according to claim 37 wherein the electrical connection arrangement is arranged to provide said connection automatically.*

*39. The method according to claim 36 wherein the DC power supply is a battery.*

*40. The method according to claim 36 wherein the DC power supply includes a rectifier for rectifying an AC power supply.*

*41. The method according to claim 36 wherein the DC power supply is located in the covering material.*

*42. The method according to claim 36 wherein the covering material forms a wall and wherein the power supply is located in a cavity in the wall.*

*43. The method according to claim 36 wherein the enhancement material comprises a humectant.*

*44. The method according to claim 36 including maintaining the anode member electrochemically active.*

*45. A method of at least one of cathodically protecting and passivating a metal section in concrete comprising:*

*providing at least one sacrificial anode;*

*providing a source of DC power with a negative connection and a positive connection;*

*in a first protection step, electrically connecting one of the connections of the source of DC power to the metal section to be cathodically protected: and electrically connecting the sacrificial anode in series with the other connection of the source of DC power such that the voltage generated by the source of DC power is added to the galvanic voltage, generated between the sacrificial anode and the metal section, to produce a voltage greater than the galvanic voltage generated between the sacrificial anode and the metal section alone; and,*

*in a second protection step, electrically connecting the sacrificial anode to the metal section with at least one electron conducting conductor that is not in series with the source of DC power to provide a path for electronic current to flow between the sacrificial anode and the*

*metal section, such that the current is generated solely by the galvanic voltage between the sacrificial anode and the metal section.*

46. *The method as claimed in claim 45 wherein the connection between the sacrificial anode and the source of DC power is an impressed current anode connection.*

47. *The method as claimed in claim 45 wherein the anode is buried within a cavity in concrete.*

48. *The method as claimed in claim 47 wherein the cavity comprises a drilled hole.*

49. *The method as claimed in claim 45 wherein the source of DC power is a battery.*

*50. A method of protecting and/or passivating steel in concrete comprising:*

*providing a sacrificial anode;*

*forming a cavity in the concrete by cutting a hole;*

*embedding the sacrificial anode in a porous matrix in the cavity;*

*providing a source of DC power with a negative connection and a positive connection;*

*electrically connecting one of the connections of the source of DC power to the steel to be cathodically protected; and*

*electrically connecting the sacrificial anode in series with the other connection of the source of DC power such that the voltage generated by the source of DC power is added to the voltage generated between the sacrificial anode and the steel to produce a voltage greater than the galvanic voltage generated between the sacrificial anode and the steel alone;*

*wherein the source of DC power is located spaced from the cavity and the connections to the source of DC power comprise an electrical conductor defined by one of wires and cables.*

51. *The method as claimed in claim 50 wherein the connection between the sacrificial anode and the source of DC power is an impressed current anode connection.*

52. *A method for cathodic protection of steel material in a covering material comprising concrete, mortar or masonry material such that at least a part of the steel material is at least partly covered by the covering material, the method comprising:*

*providing at least one anode member which is formed of an anode material which is more electro-negative than the steel material such that galvanic action generates a galvanic potential difference therebetween;*

*arranging the anode member at least partly buried within with the covering material for communication of ions therebetween;*

*providing an enhancement material which cooperates with the sacrificial anode material in enhancing the communication of ions between the covering material and the anode material;*

*and providing an electrical connection arrangement between said at least one anode member and the steel material including a DC power supply such that the potential difference between said at least one anode member and the steel material is greater than the galvanic potential difference.*

53. *The method according to claim 52 wherein the electrical connection arrangement is arranged such that, when the DC power supply becomes inactive, a connection of said at least one anode to the steel material is provided to allow current to flow therebetween caused by the galvanic potential alone.*

54. *The method according to claim 52 wherein the electrical connection arrangement is arranged to provide said connection automatically.*

55. *The method according to claim 52 wherein the DC power supply is a battery.*

56. *The method according to claim 52 wherein the DC power supply includes a rectifier for rectifying an AC power supply.*

57. *The method according to claim 52 wherein the DC power supply is located in the covering material.*

58. *The method according to claim 52 wherein the covering material forms a wall and wherein the power supply is located in a cavity in the wall.*

59. *The method according to claim 52 wherein the enhancement material comprises a humectant.*

60. *The method according to claim 52 including maintaining the anode member electrochemically active.*

* * * * *